(12) United States Patent
Cerwin

(10) Patent No.: US 10,150,167 B2
(45) Date of Patent: Dec. 11, 2018

(54) ROTARY BORING TOOL ALIGNMENT AND DEPTH INDICATION SYSTEM

(71) Applicant: John Cerwin, Gurnee, IL (US)

(72) Inventor: John Cerwin, Gurnee, IL (US)

( * ) Notice: Subject to any disclaimer, the term of this patent is extended or adjusted under 35 U.S.C. 154(b) by 125 days.

(21) Appl. No.: 15/295,343

(22) Filed: Oct. 17, 2016

(65) Prior Publication Data

US 2017/0106453 A1 Apr. 20, 2017

Related U.S. Application Data

(60) Provisional application No. 62/242,304, filed on Oct. 16, 2016.

(51) Int. Cl.
*B23Q 17/22* (2006.01)
*B23B 51/00* (2006.01)
*B25H 1/00* (2006.01)
*B23B 49/00* (2006.01)

(52) U.S. Cl.
CPC .......... *B23B 51/0054* (2013.01); *B23B 49/00* (2013.01); *B25H 1/0092* (2013.01); *B23B 2260/004* (2013.01); *B23B 2260/0487* (2013.01); *B23B 2260/088* (2013.01); *B23B 2260/092* (2013.01)

(58) Field of Classification Search
CPC .. B23Q 17/22; B23Q 17/2233; B23B 51/0054
USPC .......................................... 33/638, 642, 836
See application file for complete search history.

(56) References Cited

U.S. PATENT DOCUMENTS

| | | | | |
|---|---|---|---|---|
| 3,724,963 | A * | 4/1973 | Stadtmiller | B23Q 16/001 33/642 |
| 7,464,478 | B2 * | 12/2008 | Adrian | B23B 49/00 33/286 |
| 9,114,494 | B1 * | 8/2015 | Mah | B23Q 17/2233 |
| 2004/0215395 | A1 * | 10/2004 | Strasser | B23B 49/006 702/9 |
| 2006/0112580 | A1 * | 6/2006 | DeKeyser | B25C 7/00 33/626 |
| 2007/0017110 | A1 * | 1/2007 | Oishi | G03F 9/7015 33/645 |
| 2009/0260239 | A1 * | 10/2009 | Cerwin | B23B 49/006 33/286 |
| 2014/0157610 | A1 * | 6/2014 | Garvey | G01B 21/04 33/503 |
| 2014/0362387 | A1 * | 12/2014 | Yamamoto | B23Q 17/2233 356/614 |

(Continued)

*Primary Examiner* — G. Bradley Bennett
(74) *Attorney, Agent, or Firm* — IP Law Leaders, PLLC

(57) ABSTRACT

A device for assisting an operator of a boring instrument having a penetrating element for penetration a work surface that includes a retention member adapted to be connected to a rotating element of the boring instrument and adapted to receive a laser and a plurality of mirrors including a beam splitting alignment mirrors that directs a laser beam in a direction parallel with a penetrating element and perpendicular to a work surface, and a depth indication mirror that reflects a light beam at an angle of less than 90 degrees from said retaining member to a location on said work surface wherein the location of the beams from the alignment beams is maintained at a fixed radial position when the retention member perpendicularly moves towards a work surface and wherein the beam is rotated defines a circle.

17 Claims, 15 Drawing Sheets

(56) References Cited

U.S. PATENT DOCUMENTS

2015/0014004 A1\* 1/2015 Schubert ............ B23Q 17/2233
  173/1
2017/0120408 A1\* 5/2017 Reese ..................... B23B 47/32

\* cited by examiner

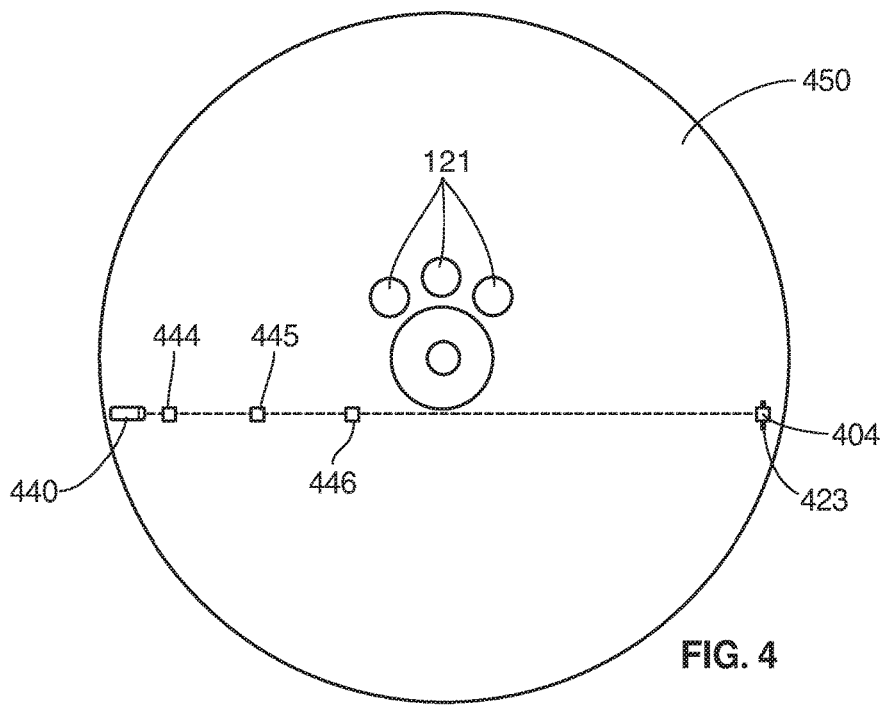
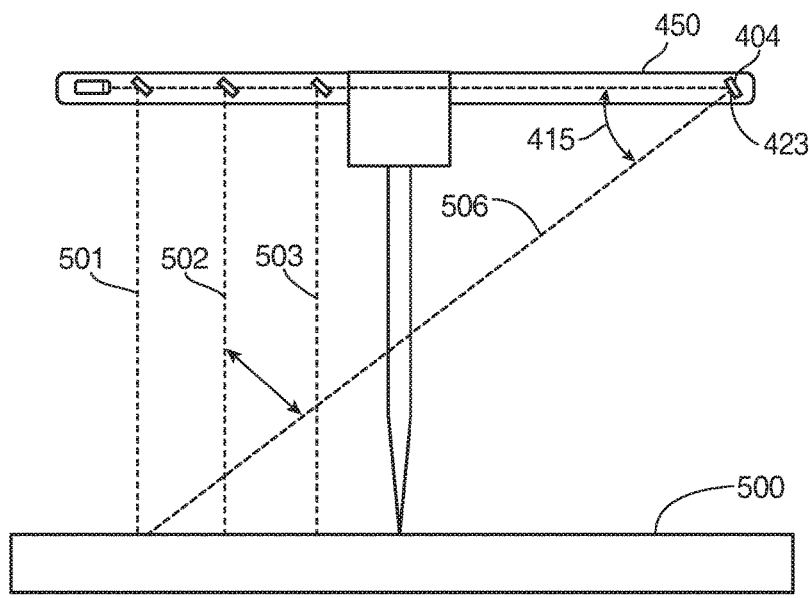

ROTARY BORING TOOL ALIGNMENT AND DEPTH INDICATION SYSTEM

The Applicant claims the benefit of priority of the filing date of U.S. Application No. 62/242,304 filed Oct. 16, 2015. The present invention is generally directed to rotary boring tool alignment and depth indication systems.

FIELD OF THE INVENTION

Background of the Invention

Both do it yourself workers and skilled craftsmen often experience difficulty in maintaining correct alignment of a rotary boring tool with a work surface—such as a workpiece being drilled by a hand-held power drill. For example, drill operators may also experience difficulty in determining the depth of a rotary boring instrument as it penetrates a surface that is being worked by the tool. There is a continuing need for an apparatus that helps a user maintain the correct alignment of a rotary boring tool with a work surface as well as to indicate the depth of the boring instrument or cutting tool as it penetrates the surface. The present invention and its associated specific embodiments disclose improvements to U.S. Pat. No. 7,992,311, which is incorporated by reference herein, as well as new methods and implementations for a rotary boring tool alignment and depth indication system.

BRIEF DESCRIPTION OF THE DRAWINGS

FIG. 4 is bottom view of an alternative embodiment of a rotary boring and depth indication system wherein the angle of the laser beam can be adjusted.

FIG. 5 is a side view in elevation of the alignment and depth indication system of FIG. 4.

DETAILED DESCRIPTION OF EMBODIMENTS OF THE INVENTION

This present invention is generally directed to rotary boring tool alignment and depth indication systems. In an embodiment of the invention a rotary power tool alignment and depth indication system is provided to improve both the functionality and usability of rotary power tools. The system and devices disclosed may be used on a variety of rotating power tools and includes, but is not limited to hand-held power drills of all sorts, stationary drill presses, smaller rotary tools, as well as larger boring devices such as earth boring machinery. The system can also be used in connection with other types of rotating machinery such as milling machines, machine tools, and lathes. For purposes of simplicity, the embodiments described below are provided in the context of hand-held power drills. However, the advantages provided by the invention are equally applicable to many types of rotary power tools. These advantages include, but are not limited to both visual work surface alignment and visual drill bit or cutting tool depth indication. With regard to the proper work surface alignment feature, the system allows a power drill user to quickly visualize if the drill is perpendicularly aligned with a work surface. The system can be used regardless of the relative orientation of the work surface. Proper horizontal and vertical alignment will provide for a borehole that is completely perpendicular to the work surface. Because the system does not depend on gravity, the orientation of the work surface is inconsequential. In addition, the system of the invention does not require sensors or computing, so it is both simple and low cost.

Figure 1:
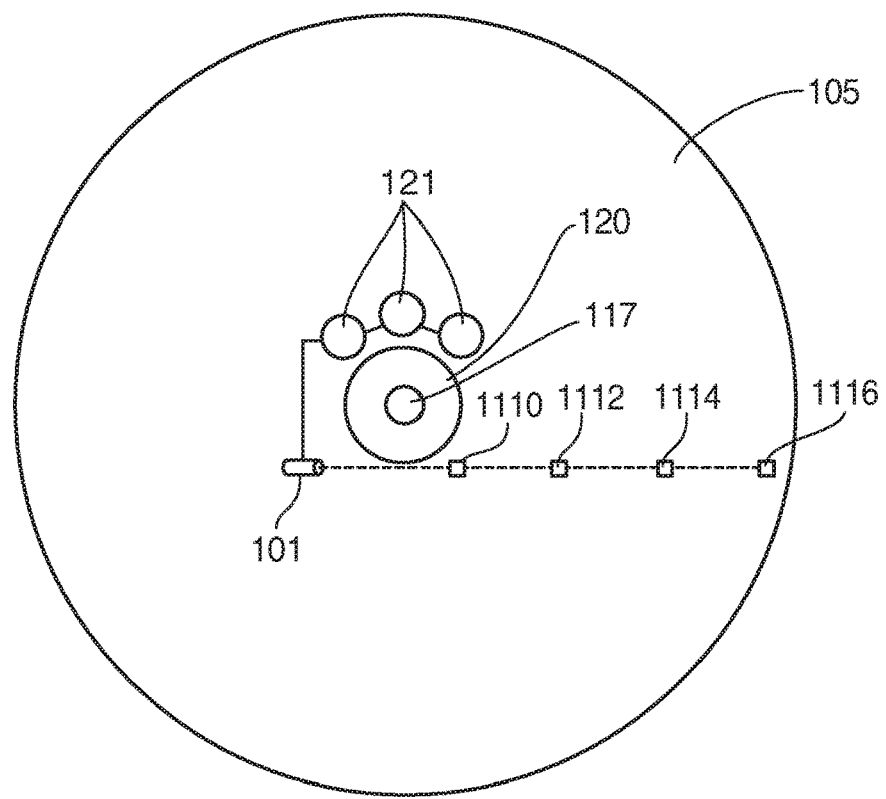
FIG. 1 is a bottom view of a rotary boring and depth indication system that includes a disk body and penetrating tool holder.

Now referring to FIG. 1, a laser 101 used with the system produces two or more essentially annular ring visible projections on a work surface that provide a visual indication of drill alignment or misdirection. If the drill bit is aligned perpendicular to the work surface the rings will be circular rings. If the drill bit is offset, the rings will be oval or elliptical. These laser projections are created by the rotation of the laser in conjunction with the rotating portion of the power drill. Laser 101 is mounted on disk body 105 and powered by batteries 121. In various embodiments the batteries are located on the disk in locations to balance the weight of the elements of the disk. The embodiment of FIG. 1 includes three beam splitter mirrors 1110, 1112, 1114 and mirror 1116. Mirrors 1110, 1112 and 1114 reflect part of the laser beam at 90 degree angles from the disk body downward toward work surface 301. The light beams are parallel with the boring element 117. Mirror 1116 reflects the beam downward at an angle that is approximately 45 degrees with respect to the disk body 105 and work surface 301. As the boring element 117 penetrates the work surface 301, the disk body 105 moves toward the work surface and the distance between the lower surface of the disk body 105 and top surface of the work surface 301 decreases and the projection on the work surface caused by the reflection of the laser beam on mirror 1116 moves toward the boring element 117 and the central axis. The system as described provides the user a visual indication and continuous feedback of the respective drilling as it progresses into a work surface with respect to both vertical alignment and the penetrating depth.

By comparing the relative location or distance between the image that is projected from mirror 1116 with the other image projections from mirrors 1110, 1112 and 1114, the user can determine the respective depth that the drill bit has reached within the work surface.

Figure 3:
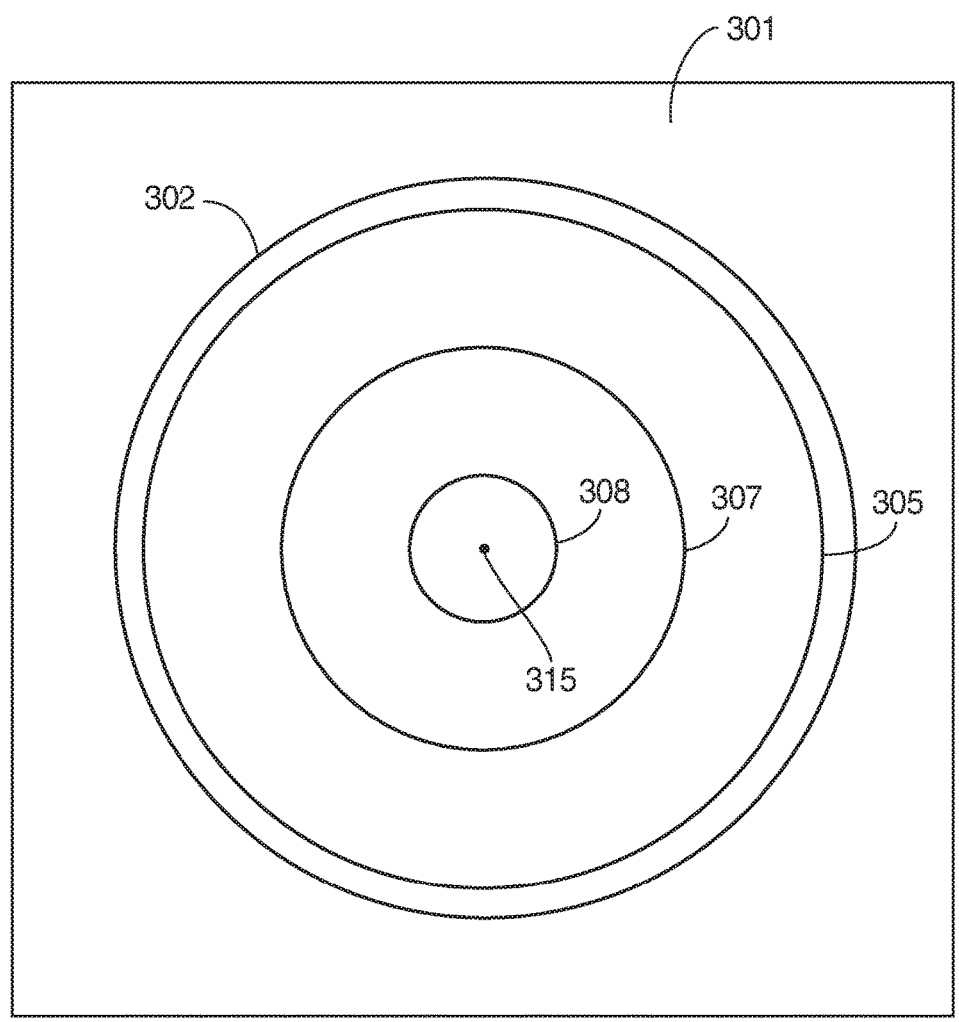
FIG. 3 is a top view of a work surface depicting laser light patterns projected on a work surface using the embodiment in FIGS. 1 and 2 as the embodiment is rotated.

Referring now to FIG. 3, a first light projection 302, second light projections 305, third projection 307 and fourth projection 308 produce concentric light circular patterns on the work surface 301 when the power drill is being held at a perpendicular angle with respect to the work surface 301. Conversely, when the power drill is misaligned with the work surface 301, the first light projection 302 will become non-concentric with regards to the second light projection 305 (and projections 307 and 308). Further, the first light projection 302 will become increasing elliptical as misalignment increases. The combination of these factors makes it easy for a power drill user (i.e., power drill operator) to visualize and quickly correct for any drill misalignment.

In the embodiment depicted in FIG. 1, the circumference of the outer annular ring 302 will decrease as the disk moves toward the work surface 301. The remaining image projections will remain at the same circumference as the disk approaches the work surface. In embodiments, the disk body is made of a transparent material so that the user can inspect the work surface through the disk. In an alternative embodiment, the disk body may have one or more open slots or sections that also allow the user to inspect the work surface through the disk. In the latter case, the disk body material does not need to be transparent.

The embodiments pictured in FIGS. 4, 7, 10, and 23 all employ the use of an angled mirror on an adjustable pivot. Referring now to FIGS. 4 and 5, a pivot 423 provided on disk 450 optionally allows the angle 415 between the perpendicular beams 501, 502 and 503 and the angled beam 506 to be reconfigured from a standard 45 degrees to an alternative angle. If the angle is reduced, the distance between the first light projection 503 and the second light is reduced thus allowing longer drill bits to be accommodated. Further, the power drill operator may wish to move the associated laser beam's pattern created by beams 501 502 and 503 on the work surface 30 closer to one of the associated laser beam patterns 506 on the work surface 500. Such angular adjustments are accomplished prior to the commencement of drilling operations.

Figure 13:
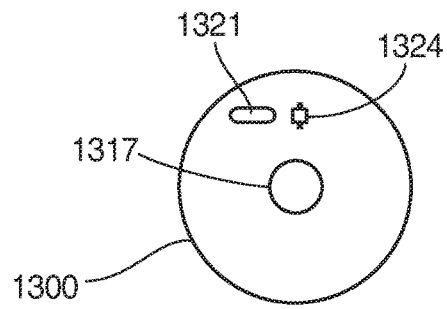
FIG. 13 is bottom view of yet a further embodiment of a rotary boring system using a single laser chuck and a diffractive optical element.
Figure 14:
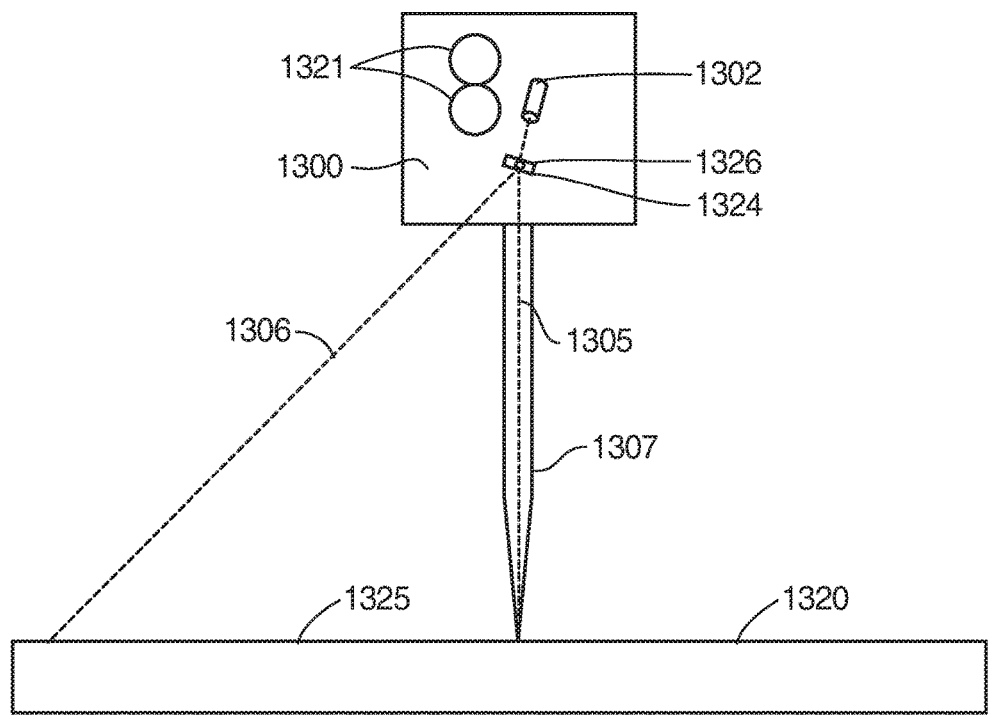
FIG. 14 is a side view in elevation of the alignment and depth indication system of FIG. 13.

FIGS. 13 and 14 includes a bottom view and side view, respectively of drill bit chuck 1300 with integrated rotary boring and depth indication functionality based on a Diffractive Lens or Diffractive Optical Element (collectively "DOE") 624 instead of a combination of beam splitters and mirrors. The DOE 1324 is controlled by mechanical adjustment member 1326 which controls the angle of the projected beam from laser 1302.

In general, with regards to drill bit or cutting tool depth indication, embodiments of the invention optionally provides a power drill user with the ability to quickly visualize the depth of a drill bit as it bores into a work surface. This feature is advantageous because the power drill user may need to limit or monitor the depth of their drilling operations. The depth indication feature may be used in combination with other features, such as work surface alignment.

In several embodiments depth indication is accomplished by watching a first light projection such as projection 302, projected from the angled mirror be reduced in diameter with reference to the second light projection (or projections) 305 as the drill is pressed into the work surface 30.

Figure 7:
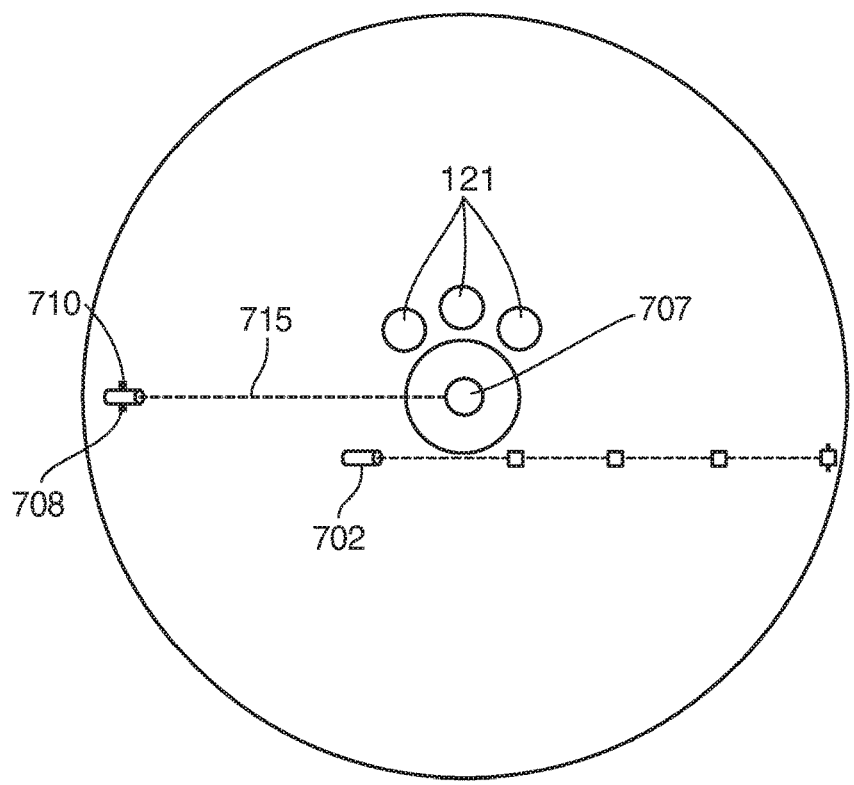
FIG. 7 is bottom view of an alternative embodiment of a rotary boring and depth indication system wherein the angle of the laser beam can be adjusted and an additional laser beam can be used as a marker on the drill bit.
Figure 8:
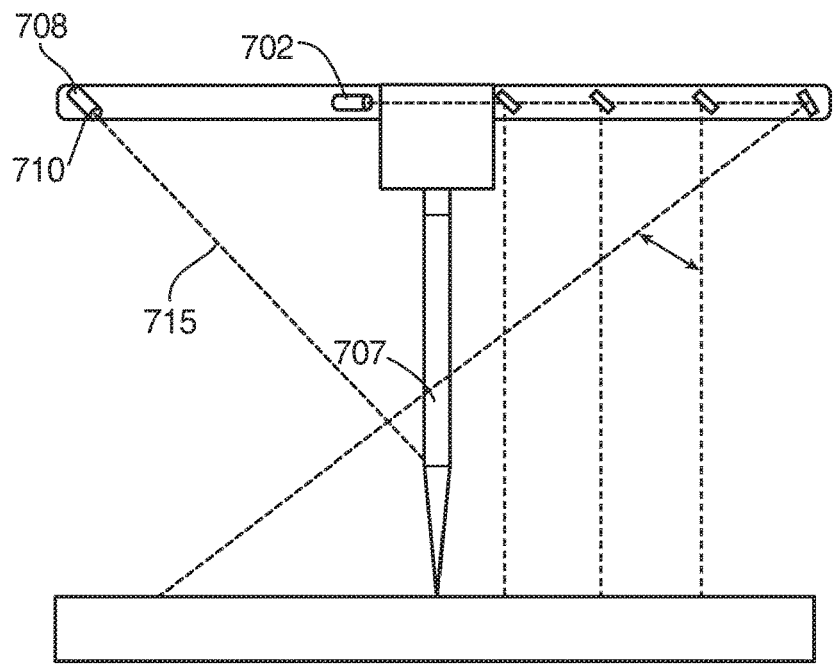
FIG. 8 is a side view in elevation of the alignment and depth indication system of FIG. 7.
Figure 16:
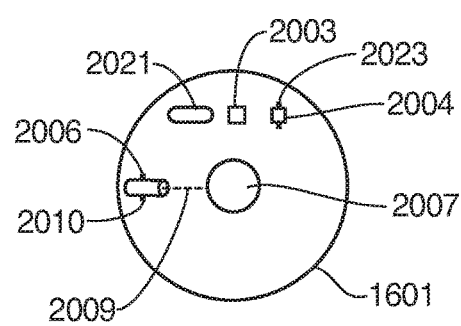
FIG. 16 is bottom view of yet a further embodiment of a rotary boring and depth indication system using a single laser chuck, a diffractive optical element, and a separate depth laser.
Figure 20:
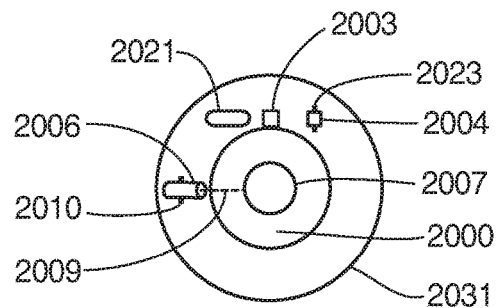
FIG. 20 is bottom view of a chuck collar and laser according to a further embodiment of the invention.
Figure 21:
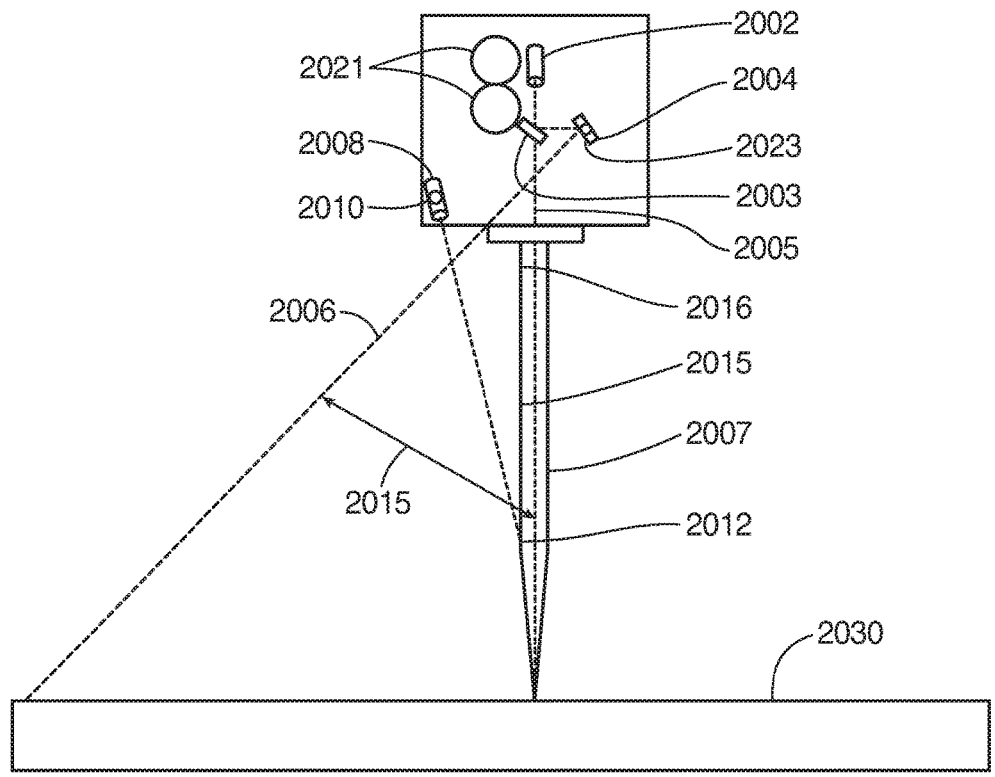
FIG. 21 is a side view in elevation of the alignment and depth indication system of FIG. 20.

In the embodiments depicted in FIGS. 7, 16 and 20, a separate depth laser is provided. Referring now to FIGS. 7 and 8, laser 708 can be adjusted via pivot 710 to provide a depth target. Adjustable pivot 710 allows the laser beam 715 to point directly at a specific spot on the drill bit 707. This provides the drill operator with the ability to "mark" a target depth on the drill bit 707 that he wishes to eventually obtain. This adjustment is done prior to the commencement of drilling operations. During drilling operations, the rotational motion of the drill creates the illusion of a complete circle around the bit at the marked point thus making it easy for the operator to see the depth mark from any vantage point around the drill.

Figure 23:
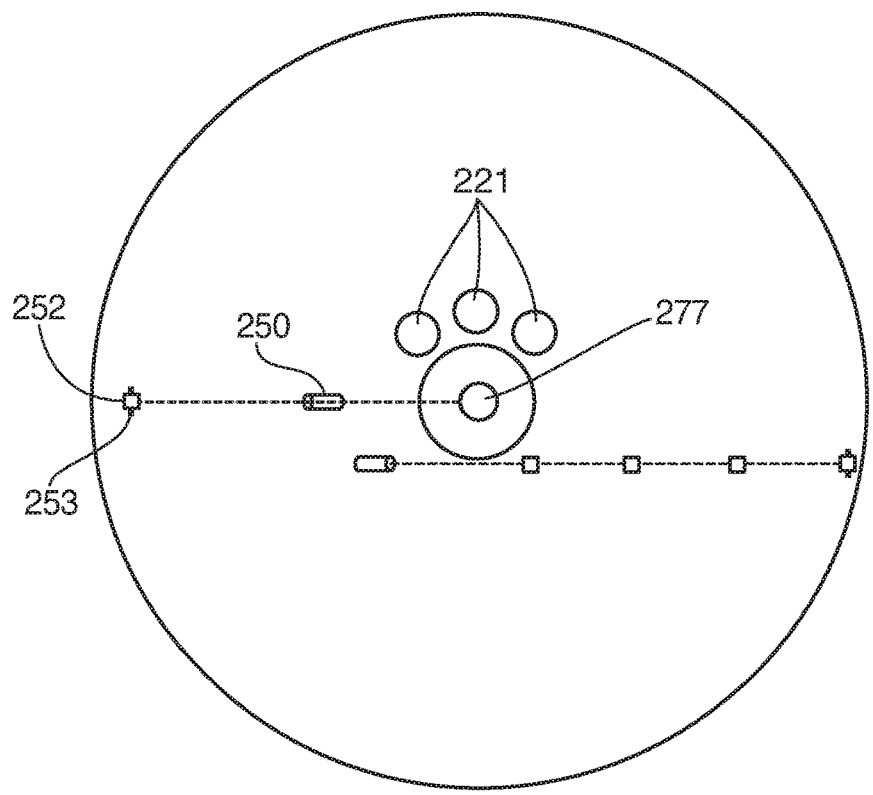
FIG. 23 is a bottom view of a single laser disk with an adjustable angle by mirror and pivot.

In yet another embodiment as depicted in FIG. 23, beam 259 originates from a separate laser 250 is directed towards first mirror 252 that can be can be adjusted via pivot 253 to provide a depth target on drill bit 277. Adjustable pivot 253 allows the laser beam 259 to point directly at a specific spot on drill bit 277. This embodiment also provides the drill operator with the ability to "mark" a target depth on the drill bit 277 that he or she wishes to eventually obtain using a method similar to that discussed with respect to FIGS. 7, 16, and 20 but with an adjustable mirror.

It should be understood that the features discussed in each individual embodiment can be used singularly in that embodiment or in combination with each other in that embodiment. Further, one or more features from each individual embodiment can also be applied to or included in other individual embodiments. For example, a Diffractive Lens or Diffractive Optical Element (collectively "DOE") 624 as depicted in FIG. 13 may be employed in an embodiment that contains a disk body or a separate depth laser.

Figure 2:
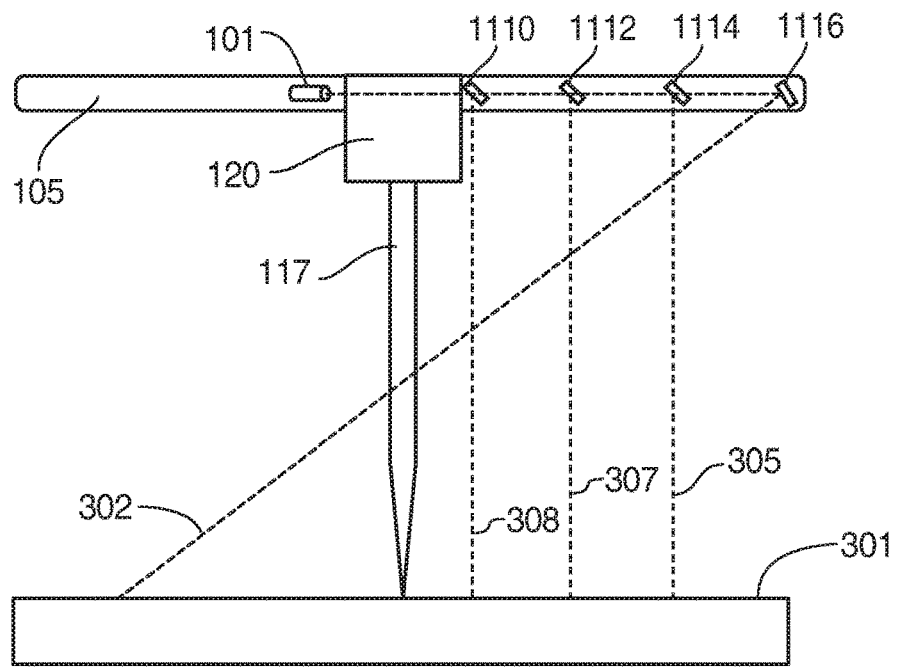
FIG. 2 is a side view in elevation of the alignment and depth indication system.

Referring back to FIG. 1 and FIG. 2 a side and top view of a rotary boring and depth indication system that includes a disk as a body 105 with a cutting tool holder 120 is shown. In the depicted embodiment there is a single laser 101 powered by batteries 121 that can be used with one or more beam splitter mirrors 1110, 1112 and 1114 and one or depth indication mirrors 1116. The laser and optics are offset from the center of the disk body 105. As seen in FIG. 2, this particular embodiment results in three perpendicular laser beams 305, 307 and 308 and a single angled laser beam 302 that is positioned at 45 degrees with reference to laser beams 305 307 and 308. FIG. 3 depicts the laser patterns produced on a work surface 301 from the version depicted in FIGS. 1 and 2 when it is rotating on the power drill. In one embodiment, the cutting tool holder 120 is a quick change drill bit connector as known in the art. In another embodiment, the cutting tool holder 120 is a drill bit chuck. In other related embodiments, the device can use numerous beam splitters mirrors that can create a plurality of ring images on a work surface from a single laser. In yet further embodiments the radial location of the mirrors can be altered. The embodiment of FIGS. 1 and 2 are advantageous because they only require a single laser to produce more than two beams, and use of a single laser can reduce both the cost of the embodiment and the overall power required to operate the embodiment. This embodiment and/or set of embodiments can be mounted into the existing chuck of a power drill, or serve as a chuck replacement.

Figure 6:
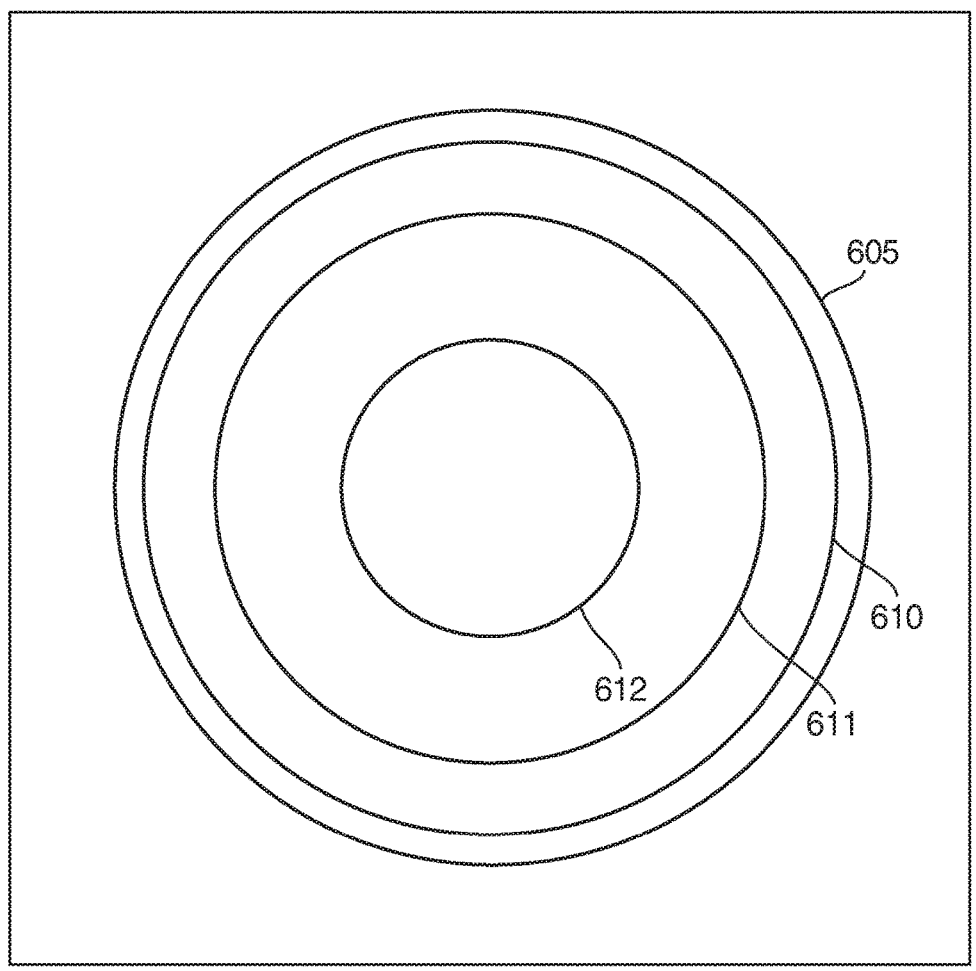
FIG. 6 is a top view of the work surface depicting alternative laser light patterns projected the work surface using the embodiment of FIGS. 4 and 5 as the embodiment is rotated.

Now referring to FIGS. 4 and 5 an alternative embodiment is disclosed where the angle 415 of laser beam 506 can also be optionally adjusted via an adjustable pivot 423 on mirror 404. Like the embodiment of FIG. 1 the member includes three beam splitting mirrors 444, 445 and 446 that project laser light beams 501, 502 and 503 toward work surface 500. Pivot 423 allows the angle 415 between the perpendicular beams 501, 502 and 503 and angled beam 506 to be configured from the standard 45 degrees to an alternative angle. If the angle is reduced, longer drill bits can be accommodated. Further, the tool operator may wish to move the associated laser beam's pattern at the initiation of the operation. For example, the location of outer image 605 created by beam 506 can be adjusted with respect to the patterns 610, 611 and 612 on the work surface. FIG. 4 also demonstrates the beam splitter mirrors 444, 445 and 446 on one side of the disk and the depth indication mirror 404 on the other. In embodiments, the location of the both the beam splitters and depth indication mirror can be adjusted. FIG. 6 depicts the laser patterns produced on a work surface 500 from the embodiment depicted in FIGS. 4 and 5 as is rotating on the power drill. The image includes annular pattern 605 from beam 501, pattern 610 from beam 506, annular image 611 from beam 502 and image 612 from beam 503. This device can be mounted into the existing chuck of a power drill, or serve as a chuck replacement.

In another aspect of the invention referred to as a multi-disk system, a system of interchangeable disks, shafts and cutting tool holders are provided that allow the power drill user to customize a Rotary Boring and Depth Indication device for a specific purpose. In a further embodiment, a single shaft with a built-in Quick Change Connector or standard chuck can be used with multiple disks of different diameters and configurations.

In the multi-disk system, each disk can have different beam splitter and mirror configurations including numbers and positions. For example, one disk in the system may have the beam splitters and/or mirrors separated in one inch increments, while another may be in centimeters. Further, the number of the beam splitters and/or mirrors may be different in each disk. The multi disk system described herein may also have disks of different diameters, with smaller disks for shorter drill bits and larger disks for larger drill bits. Disks in the system may also come with different configurations, diameters and features including but not limited to those depicted in FIG. 1, 7, 18 or 23. In another embodiment, different types of shafts may also operate with multi-disk system. Each shaft will be able to accept any of the disks in the system, but the shaft itself could be different. For example, the portion of the shaft that is secured into a power drill's chuck may come in different diameters to support a wide variety of large and small chucks. Additionally, the shaft could be designed for specific type of drill, such as a drill that requires threaded drill bits (like a right angle pneumatic drill). In another embodiment, different cutting tool holders may also operate with multi-disk system. For example, shafts may be offered with different cutting tool holders such as the Quick Change Drill Bit Connector or a traditional drill bit chuck. These embodiments are advantageous because they allow the power drill user to maintain a set of interchangeable disks and shafts that allow them to customize a Rotary Boring and Depth Indication device for a specific purpose or type of operation. This embodiment and/or set of embodiments can be mounted into the existing chuck of a power drill, or serve as a chuck replacement.

Referring now to FIG. 7, a single laser disk with depth laser beam with and adjustable angle is shown. The embodiment of FIG. 7 includes two significant additions that can be included in combination with each other or separately. First, it includes two lasers 702 and 708. While laser 702 and its associated beam splitting mirrors operate in substantially the same manner as those described with respect to FIG. 1, second laser 708 is provided. Second laser 708 can be adjusted via pivot 710 to provide a beam that can serve to provide indication relating to a depth target. As seen in FIG. 8, the adjustable pivot allows the laser beam 715 from laser 708 to be pointed directly at a specific spot on the penetrating drill bit 707. The adjustable pivot 710 can be locked into place thus preventing movement during drilling operations. This provides the drill operator with the ability to "mark" a target depth on the drill bit 707 that he or she wishes to eventually obtain. This operation is done prior to the commencement of drilling operations. During drilling operations, the rotational motion of the drill creates the illusion of a complete circle around the bit at the marked point thus making it easy for the operator to see the depth mark from any vantage point around the drill.

Figure 9:
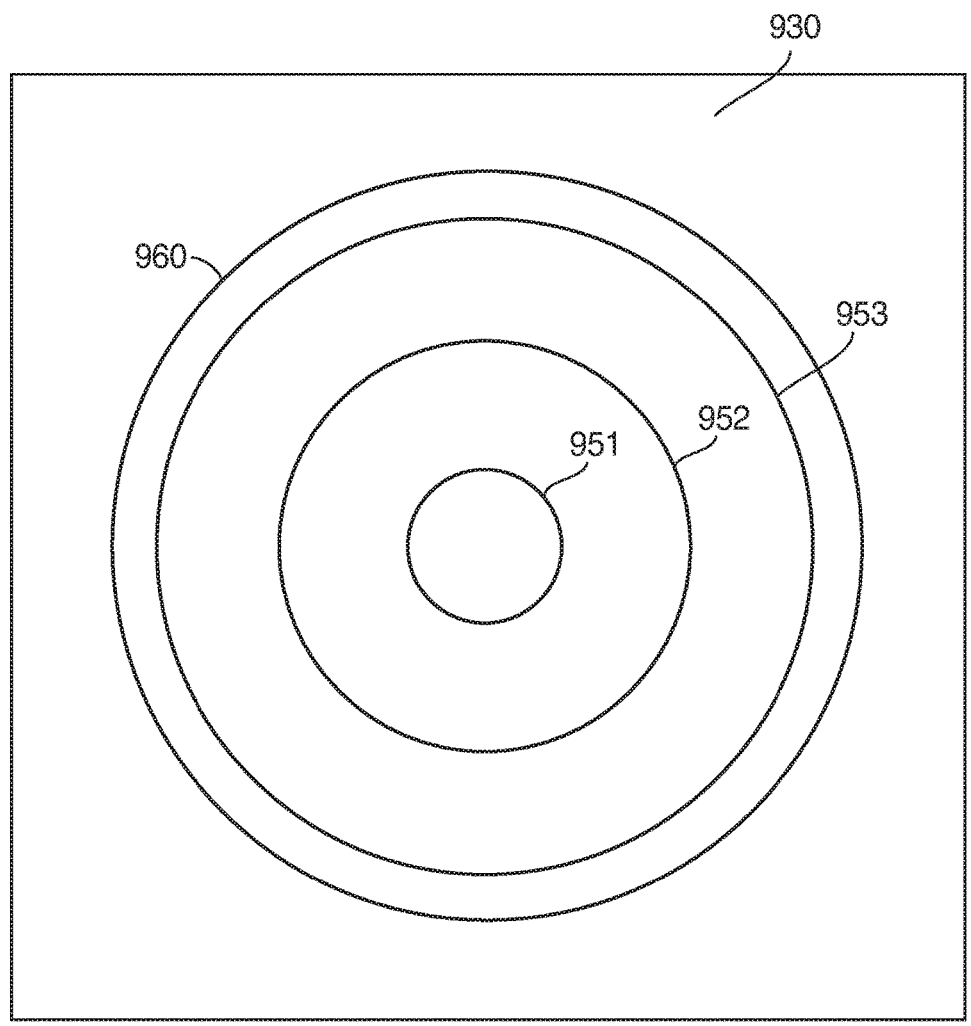
FIG. 9 is a top view of the work surface depicting alternative laser light patterns projected the work surface using the embodiment of FIGS. 7 and 8 as the embodiment is rotated.
Figure 24:
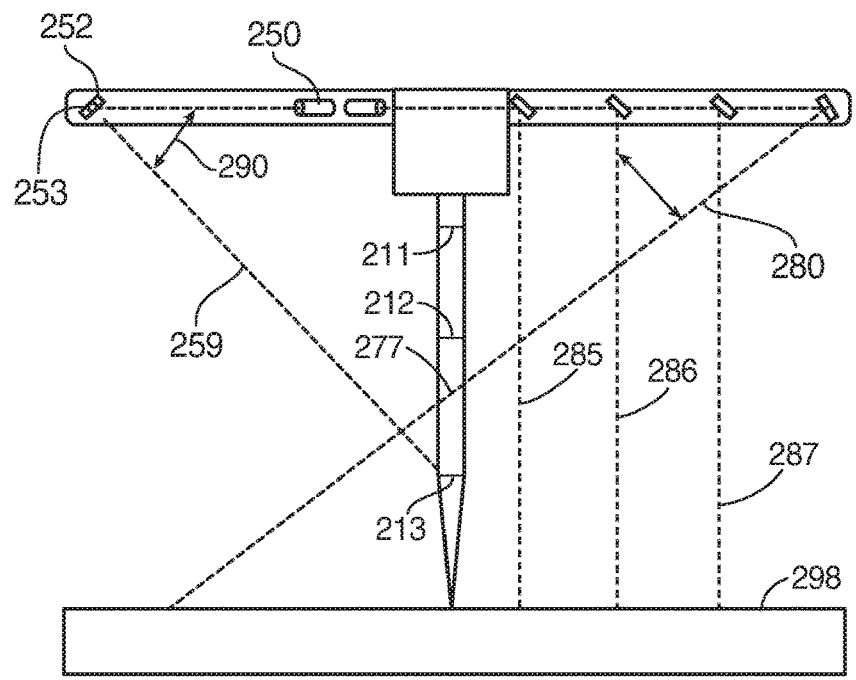
FIG. 24 is a side view in elevation of the embodiment of FIG. 23.

A further embodiment is depicted in FIGS. 23 and 24. In this embodiment the beam 259 from laser 250 is directed towards mirror 252 that can be can be adjusted via pivot 253 to provide a depth target on drill bit 277. Adjustable pivot 253 allows the laser beam 259 to point directly at a specific spot on drill bit 277 selected by the operator. Adjustable pivot 253 can be locked into place thus preventing movement during boring operations. This embodiment provides the drill operator with the ability to "mark" a target depth on the drill bit 277 that he wishes to eventually obtain. Evenly spaced gradient lines 211, 212 and 213 provided on the drill bit 277 further enhance this "laser depth beam feature" by providing the power drill user with one or more visible lines that can be used to setup the laser depth beam prior to drilling operations. These gradient lines can be painted on to drill bit, etched or machined into the drill bit, or created through some other process known in the art. The drill bit 277 gradient line spacing can be any major, minor, or combination of increments, including but not limited to inches as a major division and/or sub-inch minor divisions (such as quarters of an inch), centimeters as a major division and/or millimeters as a minor division, etc. The angle 290 of laser beam 250 can also be optionally adjusted via an adjustable pivot 253 associated with mirror 252. Pivot 253 allows the angle 290 between the disk surface and the beam 259 to be configured from the standard 45 degrees to an alternative angle. If the angle is made larger, longer drill bits can be accommodated. FIG. 9, depicts exemplary laser patterns produced on a work surface 930 from the embodiments such as depicted in FIG. 7 or 23 when it is rotating on the power drill. This embodiment and/or set of embodiments are advantageous because drill bit depth can be obtained during drilling operations with much greater certainty as the bit itself contains a depth marker that is highlighted by a beam during drilling operations. Further, since the angle of laser beam can also be optionally adjusted to less than 45 degrees, longer drill bits can be accommodated. These embodiments can be mounted into the existing chuck of a power drill, or serve as a chuck replacement.

Figure 10:
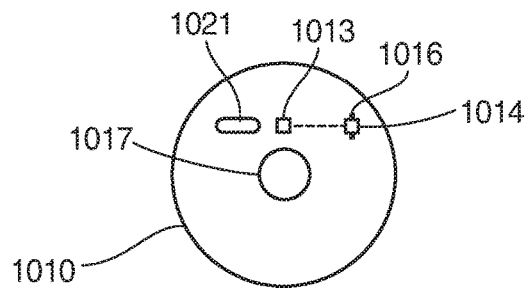
FIG. 10 is bottom view of yet a further embodiment of a rotary boring and depth indication system using a single laser chuck wherein the angle of the laser beam can be adjusted.
Figure 11:
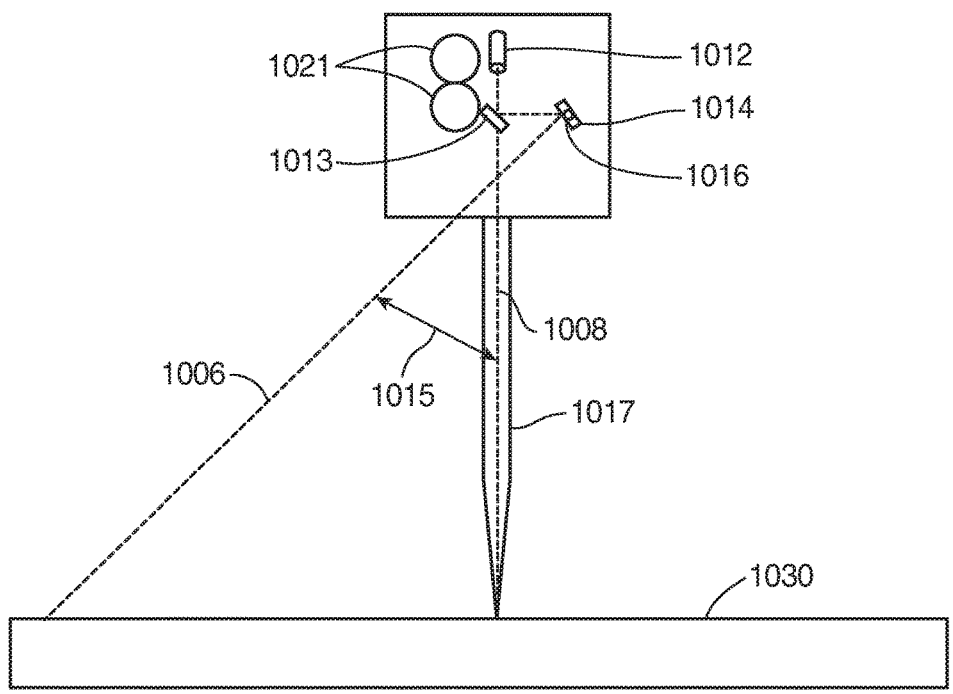
FIG. 11 is a side view in elevation of the alignment and depth indication system of FIG. 10.
Figure 12:
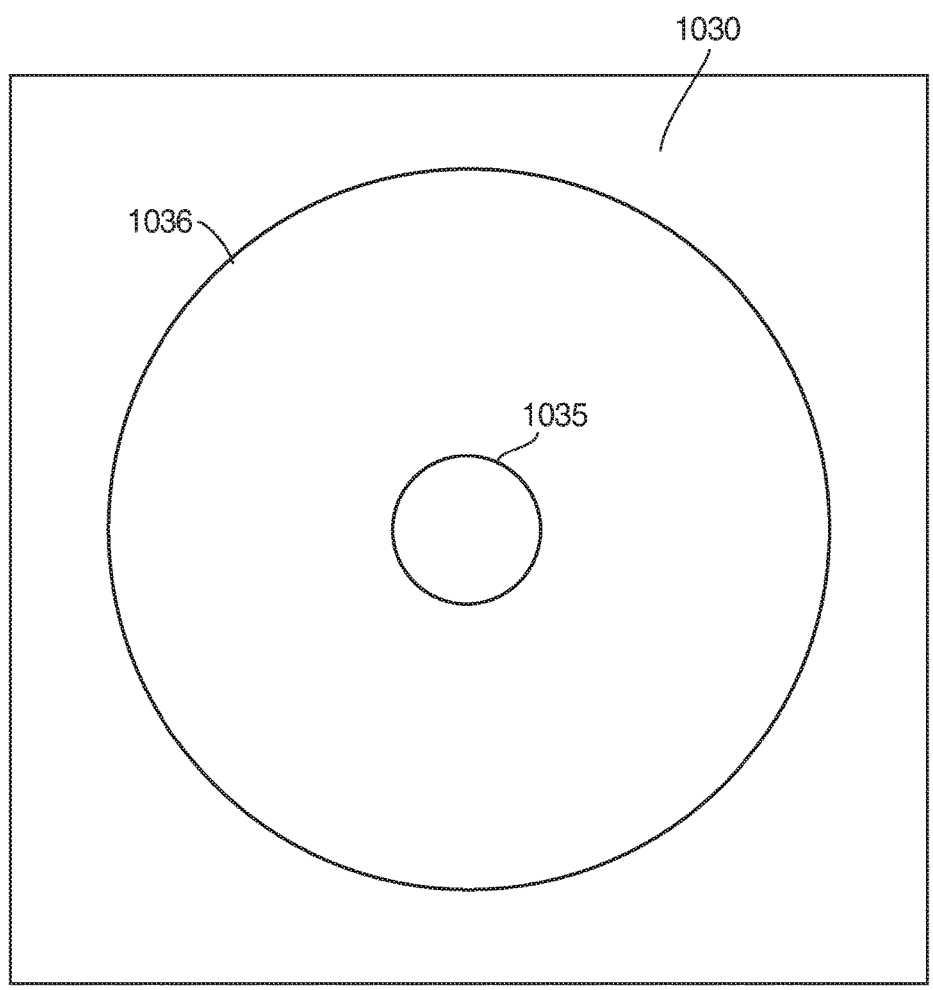
FIG. 12 is a top view of the work surface depicting alternative laser light patterns projected the work surface using the embodiment of FIGS. 10 and 11 as the embodiment is rotated.

Now referring to FIGS. 10 and 11, an embodiment having a single laser chuck with adjustable angle is disclosed. FIG. 10 depicts a bottom view of a drill bit chuck 1010 with integrated rotary boring and depth indication functionality. The chuck 1010 includes single laser 1012, beam splitter 1013, mirror 1014 on adjustable pivot 1016, and one or more batteries 1021 to power the laser. The pivot 1016 optionally allows the angle 1015 between the perpendicular beam 1008 and the angled beam 1006 to be adjusted from a standard 45 degrees to an alternative angle. If the angle is reduced, longer drill bits can be accommodated. Further, the power drill operator may wish to move the associated laser beam's pattern on the work surface closer to one of the associated laser beam patterns on the work surface. Such angular adjustments are accomplished prior to the commencement of drilling operations. FIG. 12 depicts an exemplary laser pattern produced on work surface 1030 from the embodiment depicted in FIGS. 10 and 11. with the depth beam 1036 at 45 degrees with reference to orientation beam 1035 when it is rotating on the power drill. An advantage of this embodiment is that it allows for the replacement of an existing drill chuck, or can be integrated by a drill manufacturer as a standard part of the drill. This embodiment uses a single laser to produce multiple beams, which can reduce both the cost of the embodiment and the overall power required to operate the embodiment. Further, the embodiment allows the angle 1015 between the perpendicular beam 1008 and the angled beam 1006 to be reconfigured from the standard 45 degrees to an alternative angle. If the angle is reduced, longer drill bits can be accommodated This embodiment can be mounted into the existing chuck of a power drill or serve as a chuck replacement. It can also be used as the cutting tool holder on one of the disk embodiments referenced herein.

Figure 15:
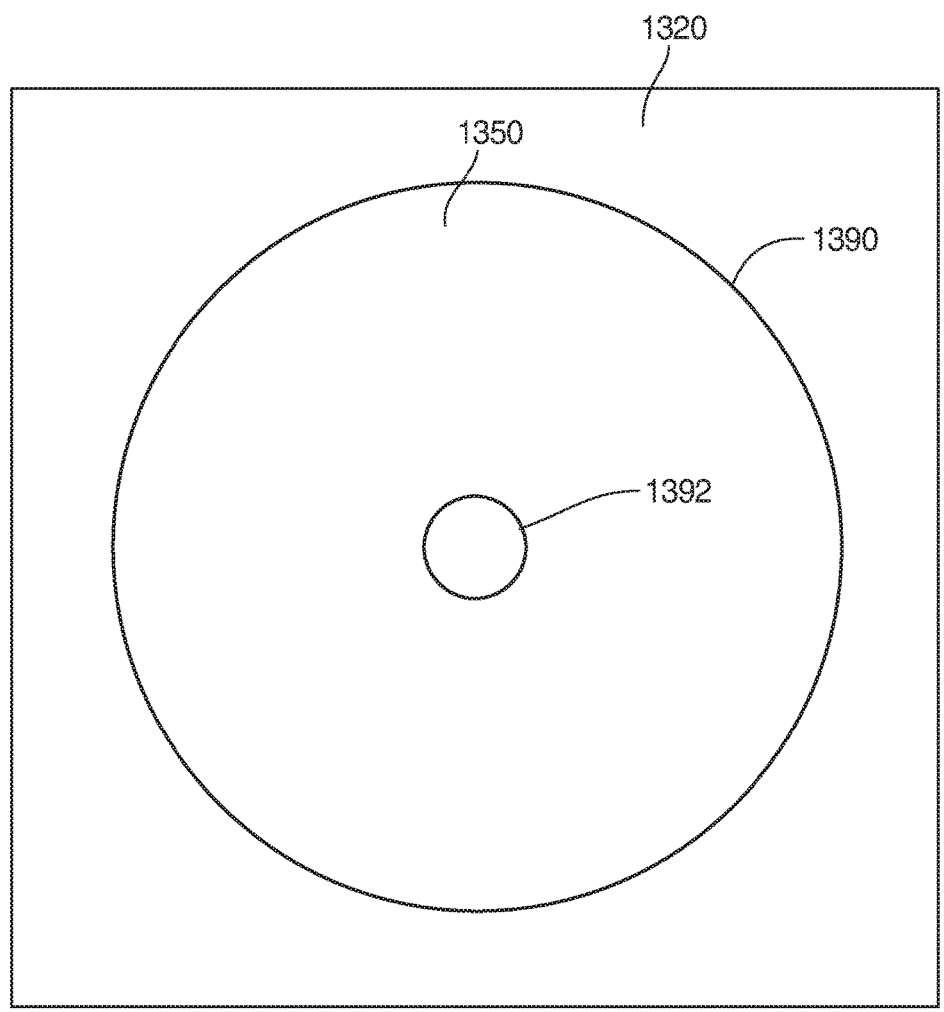
FIG. 15 is a top view of the work surface depicting alternative laser light patterns projected the work surface using the embodiment of FIGS. 13 and 14 as the embodiment is rotated.

Now referring to FIG. 13 a bottom view of a drill bit chuck with integrated rotary boring and depth indication functionality based on a Diffractive Lens or Diffractive Optical Element (collectively "DOE") 1324 instead of a combination of beam splitters and mirrors. FIG. 14 is a side view of the embodiment of FIG. 3 shown in connection with a work surface. This embodiment includes a drill bit chuck 1300, a single laser 1302, a DOE 1324, an adjustable pivot 1326 for the DOE, and one or more batteries 1321 to power the laser. The DOE modifies the beam to form a 45-degree fan angle between the beams 1305 and 1306. Edge beam 1305 projected on the work surface 20 is also angled at 90 degrees when the chuck 1300 and its associated drill bit 1307 are perpendicularly aligned with the work surface 1320. The pivot 1326 on the DOE 1324 allows the edge 1305 to be aligned or calibrated to be parallel to the drill bit 1307. This can take place one time during manufacturing, or optionally be accomplished in the field by the user. It is also possible for the angle of the pivot 1326 to be altered for other purposes besides alignment or calibration. Such angular adjustments would be accomplished prior to the commencement of drilling operations. FIG. 15 depicts the image on the work surface 1330 from the version depicted in FIGS. 13 and 14 when it is rotating on the power drill at high speed wherein edge beam 1306 defines outer edge 1390 and beam 1305 defines edge 1392. The area between the edges is illuminated by the fan beam. This embodiment produces a visible edge 1325 or line on the work surface 1320 and as the line is rotated creates an annulus shaped illuminated pattern (a "disk with hole" pattern) as illustrated by reference number 1350 when rotation occurs. In another embodiment, the DOE may be a simple Laser Line Lens that modifies the beam to form a specific fan angle between the edges 1305 and 1306. In another embodiment, the DOE may be a diffractive lens that modifies the beam to form a specific fan angle between the edges 1305 and 1306 of the light beam. In another embodiment, the DOE may be a Diffractive Optical Element that modifies the beam to form a specific fan angle between the edges 1305 and 1306. In another embodiment the DOE may provide greater brightness of edge 1305 and/or edge 1306 thus resulting in distinct or brighter patterns against the work surface 1230. In another embodiment, the DOE may provide greater brightness of edge 1305 and/or edge 1306 along with other points along the visible line or edge 1325 thus resulting in distinct or brighter patterns against the work surface 1320. In another embodiment, the DOE may modify the laser 1302 beam to form an angle between the edges 1305 and 1306 that is greater than or less than 45 degrees. For example, if the angle is reduced, longer drill bits can be accommodated. Other embodiments may also include DOEs that produce different beam projections (and thus different patterns on the work surface during rotation). The variations on these DOE beam projections can be anything known in the art. This embodiment and/or set of embodiments are advantageous because they can replace an existing drill chuck, or simply be integrated by a drill manufacturer as a standard part of the drill. Further, it eliminates the beam splitters and mirrors and replaces them with a single DOE optic and a single laser. This embodiment therefore provides for a potential reduction in size, weight, and cost. This embodiment can be mounted into the existing chuck of a power drill or serve as a chuck replacement. It can also be used as the cutting tool holder on one of the disk embodiments referenced herein.

Figure 17:
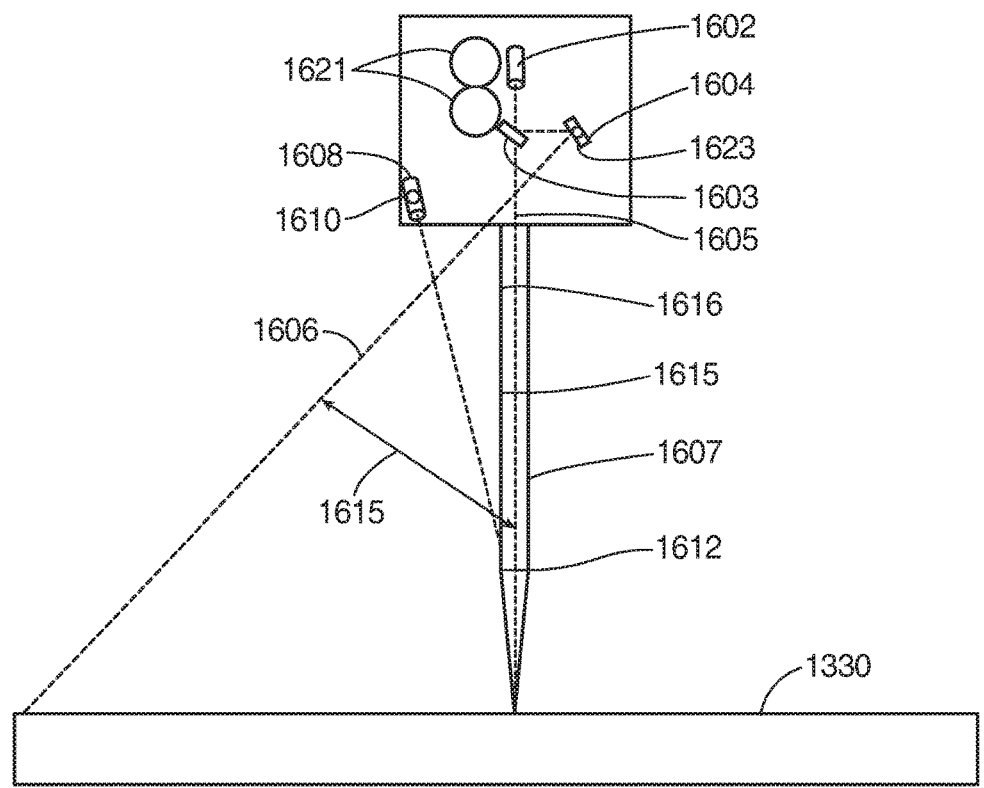
FIG. 17 is a side view in elevation of the alignment and depth indication system of FIG. 16.

FIGS. 16 and 17 depict an embodiment of a chuck with integrated rotary boring and depth indication functionality similar to the embodiment of FIGS. 10 and 11 and which further incorporates a second depth laser beam feature. The chuck 1601 includes a first laser 1602, a beam splitter 1603, mirror 1604 on adjustable pivot 1623, and one or more batteries 1621 to power the laser. The pivot 1623 allows the angle 1615 between the perpendicular beam 1605 and the angled beam 1606 to be configured from the standard 45 degrees to an alternative angle. Such angular adjustments are accomplished prior to the commencement of drilling operations. The embodiment introduces a second laser 1608 that can be adjusted via pivot 1610 to provide a depth target. This adjustable pivot allows the laser beam 1609 to point directly at a specific spot on the drill bit 1607. The adjustable pivot 1610 can be locked into place thus preventing movement during drilling operations. This provides the drill operator with the ability to "mark" a target depth on the drill bit 1607 that he wishes to eventually obtain. This marking step is done prior to the commencement of drilling operations. During drilling operations, the rotational motion of the drill creates the illusion of a complete circle around the bit at the marked point thus making it easy for the operator to see the depth mark from any vantage point around the drill. In a further embodiment similar (not shown in FIG. 17) functionality can be offered via a mirror with an adjustable pivot. In this embodiment a beam from a second laser is directed towards a mirror that can be can be adjusted via pivot to provide a depth target on the drill bit. This adjustable pivot allows the laser beam to point directly at a specific spot on the drill bit. The adjustable pivot can be locked into place thus preventing movement during drilling operations. This alternative embodiment provides the drill operator with the ability to "mark" a target depth on a drill bit that he wishes to eventually obtain.

Referring back to FIG. 17, evenly spaced gradient lines 1612, 1615 and 1616 on the drill bit 1607 further enhance this "laser depth beam feature" by providing the power drill user with one or more visible lines that can be used to setup the laser depth beam prior to drilling operations. These gradient lines can be painted on to drill bit, etched or machined into the drill bit, or created through some other process known in the art. The drill bit 1607 gradient line spacing can be any major, minor, or combination of increments, including but not limited to inches as a major division and/or sub-inch minor divisions (such as quarters of an inch), centimeters as a major division and/or millimeters as a minor division, etc. FIG. 12 depicts an example of the laser patterns produced on a work surface from the version depicted in FIGS. 16 and 17 with the angle of depth beam at 45 degrees with reference to the orientation beam when it is rotating on the power drill. This embodiment and/or set of embodiments are advantageous because they can replace an existing drill chuck, or simply be integrated by a drill manufacturer as a standard part of the drill. This embodiment and/or set of embodiments is also advantageous because drill bit depth can be obtained during drilling operations with much greater certainty as the bit itself contains a depth marker that is highlighted by the laser during drilling operations. Additionally, since the angle of laser beam can also be optionally adjusted to less than 45 degrees, longer drill bits can be accommodated. This embodiment and/or set of embodiments can be mounted into the existing chuck of a power drill or serve as a chuck replacement. It can also be used as the cutting tool holder on one of the disk embodiments referenced herein.

Figure 18:
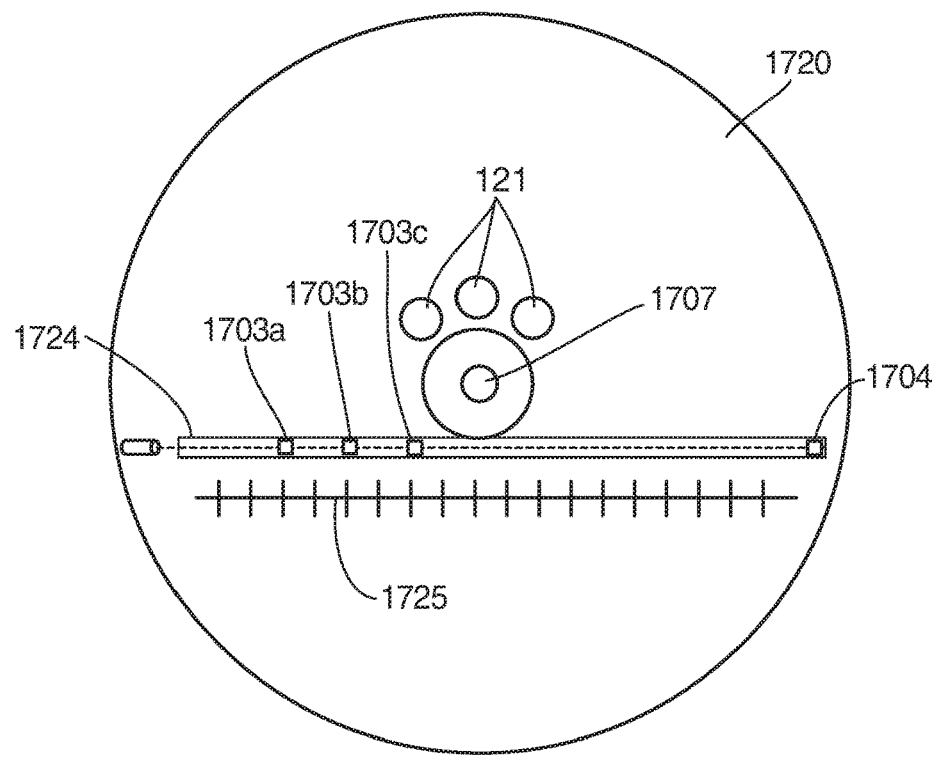
FIG. 18 is bottom view of yet a further embodiment of a rotary boring and depth indication system with an adjustable beam splitter feature.
Figure 19:
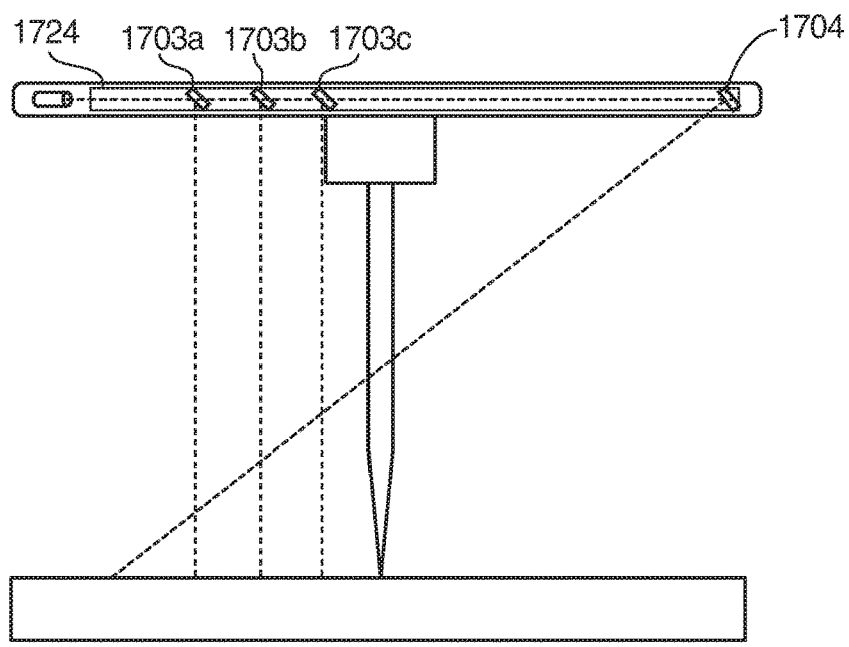
FIG. 19 is a side view in elevation of the alignment and depth indication system of FIG. 18.

FIG. 18 depicts an embodiment, similar to the embodiment depicted in FIG. 1 however the positions of the beam splitters and mirror(s) can be changed prior to the commencement of drilling operations along track 1724. An embodiment of this version also includes markings or gradients 1725 on the body 1720 that can be used to guide and position the beam splitters 1703a, 1703b and 1703c and mirror 1704. This feature allows the user to configure the version in FIG. 18 for a wide variety of drill bit lengths, measuring systems, and purposes. For example, the gradient 1725 spacing can be any major, minor, or combination of increments, including but not limited to inches as a major division and/or sub-inch minor divisions (such as quarters of an inch), centimeters as a major division and/or millimeters as a minor division, etc. This embodiment and/or set of embodiments are advantageous because a single body can support a wide variety of beam splitter and mirror configurations. This creates a single rotary boring and depth indication system that can be used for many different drilling purposes. This embodiment and/or set of embodiments are also advantageous because they only require a single laser (or single laser module) to produce more than two beams, and a single laser can reduce both the cost of the embodiment and the overall power required to operate the embodiment. In another embodiment, an entire section that contains the beam splitters 1703a-c and mirror 1704 would operate as a separate module that can be easily removed and replaced prior to drilling operations. This module concept would allow for a wide variety of configurations that work with a single disk body 1720. For example, modules could be created with: 1) Different numbers of alignment beam splitters and depth indication mirrors, 2) Adjustable or fixed positioning of the beam splitters and/or mirrors, and 3) Modules for the English or metric unit measurement systems, etc. These embodiments are advantageous because a single body can work with a wide variety of modules that can be easily removed and replaced prior to drilling operations. This embodiment therefore creates a single rotary boring and depth indication system that can be used for many different drilling purposes. This embodiment can be mounted into the existing chuck of a power drill, or serve as a chuck replacement.

Now referring to FIG. 20 a chuck attachment 2031 that incorporates one or more of the Rotary Boring and Depth Indication System alignment and/or depth features and also attaches to an existing drill chuck 2000 on a power drill. These features may include, but are not limited to, the features depicted in the embodiments of FIGS. 10, 13, and 16. In one embodiment, the chuck attachment 2031 is a fixed-size sleeve or collar that securely fits over an existing drill chuck 2000. In another embodiment, the chuck attachment is an adjustable-size sleeve or collar that can be securely fit around a variety of existing drill chucks that maintain different diameters and/or shapes. This embodiment and/or set of embodiments are advantageous because they work with an existing drill chuck, and do not require the use of a supplemental cutting tool holder (like a Quick Change Connector) or a shaft to connect with the drill.

A further embodiment is directed to a single laser disk with chuck. This version is depicted in FIGS. 1, 7 and 18 and further incorporates a conventional drill chuck (as a cutting tool holder) and a disk. The features in this version may include, but are not limited to the features depicted in the specific embodiments recited. In a further embodiment, the entire assembly (including the disk with chuck) can replace an existing drill chuck, or simply be integrated by a drill manufacturer as a standard part of the drill. In other contemplated embodiments a quick change connector is employed. In another embodiment, the chuck may contain a shaft that allows the entire assembly to be attached to an existing drill chuck. Other embodiments can have different beam splitter and mirror configurations (numbers and positions). For example, one disk in the set may have the beam splitters and/or mirrors separated in one inch increments, while another may be in centimeters. Further, the number of the beam splitters and/or mirrors may be different in each disk. Other embodiments may also have disks of different diameters, with smaller disks for shorter drill bits and larger disks for larger drill bits. Other embodiments may also come with different sets of lasers and features including but not limited to those depicted herein. This embodiment and/or set of embodiments can be mounted into the existing chuck of a power drill, or serve as a chuck replacement.

Figure 22:
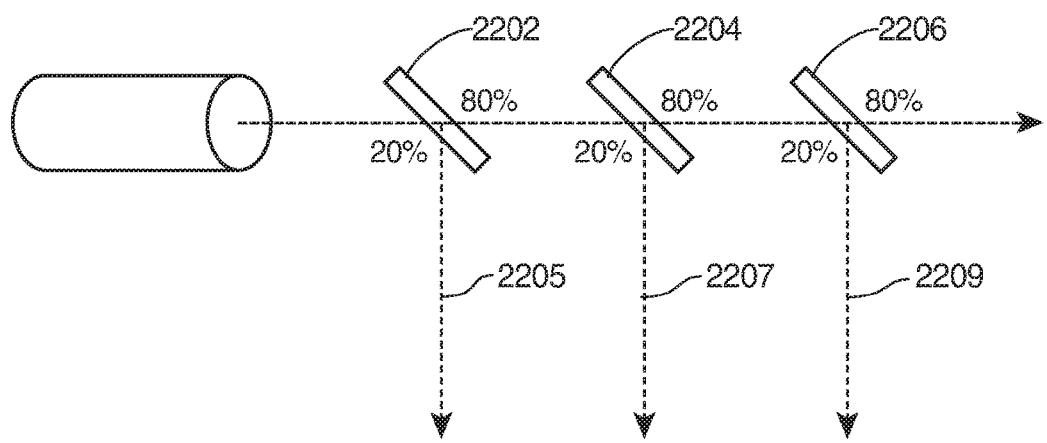
FIG. 22 is a schematic representation of a beam splitter.

In any of the embodiments that contain beam splitters, different beam division characteristics can be employed. Many common commercial beam splitters divide a light beam based on a 50%-50% division, but other divisions may be utilized. For example, in embodiments the beam from a laser must pass through several beam splitters before the depth indication mirror is reached. In such a case the beam splitters may employee a division other than 50% so as to pass a greater percentage of the beam onto the next splitter and ultimately onto the depth indication mirror. Further, the division of the beam may be based on anything known in the art, such as brightness, intensity, polarization, wavelength, etc. FIG. 22 presents an example where beam splitters use an 80%-20% division. In this example, the beam split percentage allows 80% of the beam entering a beam splitter to pass through, and then reflects the remaining 20% as a beam from split mirrors 2202, 2204 and 2206 respectively. In one embodiment, the beam splitters may maintain a 50%-50% division. In another embodiment, the division may be an 80%-20% division, or some other such division known in the art. Further, in another embodiment, the division may be staggered across a series of beam splitters with one or more beam splitters using different divisions.

I claim:

1. A device for assisting an operator of a boring instrument having a penetrating element for penetration a work surface comprising;
   a retention member, said retention member adapted to be connected to a rotating element of a boring instrument having a cutting element said retention member adapted to receive a laser and a plurality of mirrors,
   wherein at least one of said mirrors is a beam splitting mirrors and said beam splitting mirror comprises an alignment mirror that is oriented to direct a laser beam in a direction parallel with said penetrating element and perpendicular to a work surface, and
   at least one mirror comprises a depth indication mirror, and said depth indication mirror reflects a light beam at an angle of 90 degrees or less from said retention member to a location on said work surface wherein the location of the impingement of said beams from said alignment beams is maintained at a fixed radial position when said retention member perpendicularly moves towards a work surface and wherein as the retention member is rotated, the beam from said alignment mirror defines a circle when said laser rotates in a plane that is parallel with said work surface and the impingement location from said beam from said depth indication will change as the retention member moves in a perpendicular direction towards a work surface.

2. The device of claim 1 wherein said beam splitting mirror are in a fixed position on said retention member.

3. The device of claim 1 wherein depth indication mirror further comprises a pivot and said the angle of the beam from said depth indication mirror is adjustable.

4. The device of claim 1 wherein said retention member comprises a disk.

5. The device of claim 1 further comprising means to provide a further laser light beam, wherein said further laser light beam is adapted to impinge on said penetrating element.

6. The device of claim 5 wherein said further beam originates from a second laser provided on said retention member.

7. The device of claim 1 wherein said penetrating element has gradient markings along its length.

8. A penetrating tool said tool comprising a motor, a penetrating element mounted for rotational movement and powered by said motor, a laser, said laser mounted for rotational movement also powered by said motor, a beam splitting mirror and a conventional mirror, wherein said beam splitting mirror directs a beam from said laser to form a second beam and a third beam, wherein said second beam is oriented parallel with said penetrating element and said third second beam is directed by said conventional mirror towards a work surface at an angle, wherein as said penetrating element moves perpendicular to a work surface, the image from said second beam projected on a work surface will remain at the same radial position and wherein as the retaining member is rotated, the beam from said alignment mirror defines a circle when said laser rotates in a plane that is parallel with said work surface and an image from said third beam will appear to move in a radial direction toward the axis of said penetrating element.

9. The device of claim 8 further comprising a further laser beam, said further laser beam directed at a location on said penetrating element.

10. The device of claim 8 wherein said penetrating element has gradient markings along its length.

11. A device for monitoring the alignment and depth of a penetrating element on a rotary tool, said device comprising, a first laser, a diffraction lens wherein a laser beam from said laser exits said diffraction lens and is shaped to a fan profile, wherein said profile has a first edge directed to a work surface that is substantially parallel with a penetrating element and a second edge that is projected at an angle with respect to said first edge.

12. The device as recited in claim 11 wherein said lens is provided with a manual an adjustment element that allows the operator to adjust said angle.

13. The device of claim 12 further comprising a further laser beam, said further laser beam directed at a location on said penetrating element.

14. The device of claim 13 wherein said penetrating element has gradient markings along its length.

15. A device for assisting an operator to measure the depth of penetration of a penetrating element of a rotating penetrating tool comprising a laser, said laser adapted to be mounted to penetrating tool to project a beam on said penetrating element.

16. The device as recited in claim 15 wherein said laser is received on an adjustable mount, wherein the angle of said beam may be adjusted to impinge on the surface of said penetrating element at different locations along its length.

17. The device as recited in claim 15 wherein said laser is a mounted on a retention member and said retention member is adapted for attachment to said rotating penetrating tool to allow for rotation.

* * * * *